United States Patent [19]
Betts et al.

[11] 4,237,728
[45] Dec. 9, 1980

[54] LOW TIRE WARNING SYSTEM

[75] Inventors: David A. Betts, Mentor-on-the-Lake, Ohio; Gregory W. Ledenbach, San Jose, Calif.

[73] Assignees: Gould Inc., Rolling Meadows, Ill.; National Semiconductor Corporation, Santa Clara, Calif.

[21] Appl. No.: 34,836

[22] Filed: Apr. 30, 1979

[51] Int. Cl.³ .............................................. B60C 23/02
[52] U.S. Cl. ...................................... 73/146.5; 340/58
[58] Field of Search ........................... 73/146.4, 146.5; 340/58

[56] References Cited

U.S. PATENT DOCUMENTS

| | | | |
|---|---|---|---|
| 3,760,351 | 9/1973 | Thomas | 340/58 |
| 4,117,452 | 9/1978 | Snyder et al. | 340/58 |

*Primary Examiner*—Jerry W. Myracle
*Attorney, Agent, or Firm*—Richard J. Minnich; Russell E. Baumann; Edward E. Sachs

[57] ABSTRACT

An abnormal tire profile indicating system comprising a telemetry unit mounted on each wheel of a vehicle and a central receiver. Each telemetry unit comprises a piezoelectric transducer which is deflected with each wheel revolution when the tire profile is low. Deflecting the transducer produces an electric pulse. The transducer pulses are accumulated on a charge storage capacitor to provide a power supply. When the level of charge on the capacitor reaches a predetermined level, a counter commences counting the transducer pulses. When a predetermined number of pulses are counted, the counter renders a transistor conductive, which transistor connects the power supply capacitor to an encoder and a transmitter. The encoder produces encoded signals and resets the counter after a predetermined number of encoder signals are produced. The central receiver receives the modulated radio signals from each of the telemetry units. The counter limits the transmitter to transmitting only after a sufficient number of low profiles are detected to assure reliable operation and only after a sufficient number of wheel revolutions to meet FCC periodicity of transmission requirements. The reset counter limits the duration of transmissions to meet FCC requirements.

10 Claims, 4 Drawing Figures

LOW TIRE WARNING SYSTEM

BACKGROUND OF THE INVENTION

This application pertains to the art of telemetry systems for warning of abnormal conditions and, more particularly, to wheel mounted telemetry systems for monitoring the conditions of pneumatic vehicular tires. The invention is particularly applicable to systems for monitoring automobile tires for low inflation or profile and will be described with particular reference thereto. It will be appreciated, however, that the invention has broader applications, such as monitoring tire conditions of all types of vehicles, monitoring the mechanical movement of rotating or reciprocating machinery parts, and the like. Further, the apparatus can monitor symptoms of a variety of abnormal tire conditions, including underinflation, overinflation, weakened sidewalls, and the like.

A variety of tire monitoring systems have heretofore been proposed. Many of these systems have included wheel mounted, radio transmitters for transmitting AM or FM radio signals indicative of the abnormal condition. A central receiver received the radio signals and produced a visual or audio signal to warn the driver of the abnormal condition. In some systems, the carrier frequency was amptitude or frequency modulated to enable differentiation from stray radio signals.

One of the problems with the prior tire condition sensing systems has been false signals. The receiver was subject to receiving AM and FM radio signals from various other sources such as TV stations, radio stations, CB radios, and the like. Even using a different range of frequencies than the FCC assigns to other TV and radio broadcasts did not eliminate false signal problems. Various harmonics, echoes, and tones from these signals would cause false indications of abnormal tire conditions.

Another problem was false signals caused by road conditions. For example, potholes and rough roads deflect the tire profile. Many prior art tire sensing systems could not distinguish between an abnormally low tire profile caused by underinflation and an abnormally low tire profile caused by impacting a pothole or other roughness in the road surface. Brick, cobblestone, or other washboard road surface are especially hard to distinguish from underinflation.

Another problem with prior art sensors has been the cost and reliability in meeting FCC regulations. The FCC has assigned a band of frequencies which may be used for this purpose. However, the FCC requirements limit the duration of broadcasts and the periodicity of broadcasts severely. To meet these FCC requirements, various clocks were employed. However, such clock systems were expensive, and in some instances were unreliable under the extreme temperature, centrifugal force, and impact conditions to which wheel-mounted sensors are subject.

The present invention contemplates a new and improved apparatus which overcomes all of the above-referenced problems and others, yet provides a tire condition sensing system which is simple to construct, highly reliable, and low in cost.

SUMMARY OF THE INVENTION

In accordance with the present invention, there is provided an abnormal tire condition sensing apparatus. The apparatus includes a transducer which is adapted to be mounted adjacent a pneumatic tire on a vehicle. The transducer detects the abnormal tire condition and produces electrical pulses when the abnormal condition is sensed. A counter for counting the number of pulses from the transducer is connected with the transducer. When the counter reaches a predetermined count, it produces an enable signal. An encoder produces an encoded signal. A transmitter for transmitting a modulated radio signal receives the encoded signal for modulating a carrier frequency to produce the modulated radio signal. At least one of the encoder and transmitters are connected to the counter to be enabled by the enable signal.

In accordance with a more limited aspect of the invention,

The predetermined count is so chosen that at realistic speeds, the minimum time necessary to reach the predetermined count meets the FCC regulations. Further, the predetermined count is so chosen that a sufficient number of sensings of the abnormal condition are sensed to enable the system to differentiate abnormal conditions from rough roads and other causes.

In accordance with a still more limited aspect of the invention, a counter reset is provided which monitors the modulator and resets the counter after a preselected number of modulated signal cycles have been transmitted. The number of modulator cycle periods is so selected as to meet the FCC requirements concerning duration of broadcast transmissions.

An advantage of the present invention is the relative freedom from false signals caused by rough roads and the like.

Another advantage of the present invention is the elimination of clocks and clocking systems heretofore thought necessary to meet the FCC duration and periodicity requirements.

Yet another advantage of the present invention is that its operation is relatively temperature independent.

Other advantages of the present invention will become apparent to those reading and understanding the detailed description of the preferred embodiment and specification as follows.

BRIEF DESCRIPTION OF THE DRAWINGS

The invention may take physical form in certain parts and arrangement of parts, a preferred embodiment of which will be described in detail in this specification and illustrated in the accompanying drawings which form a part thereof.

DESCRIPTION OF THE PREFERRED EMBODIMENT

Figure 1:
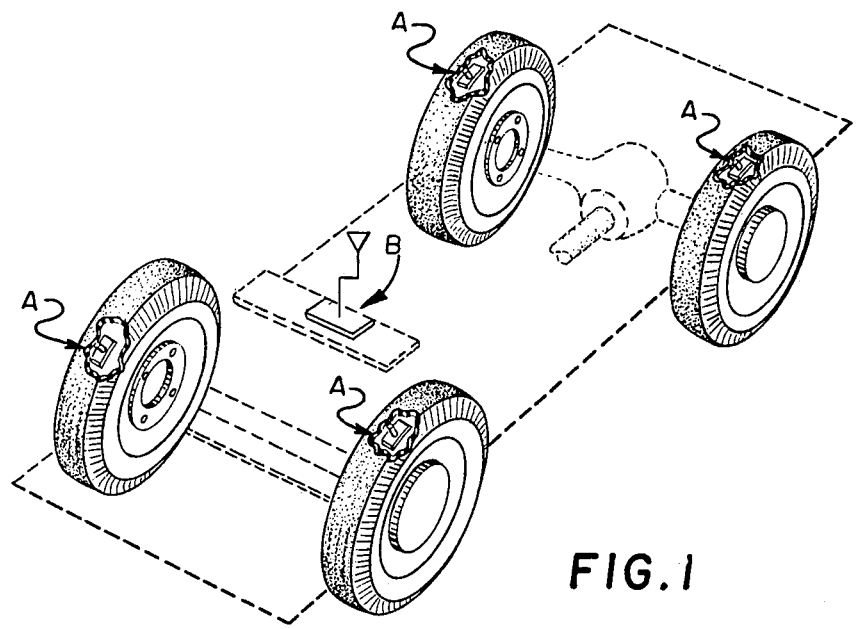
FIG. 1 illustrates an abnormal tire condition sensing and indicating system in accordance with the present invention including telemetry units in combination with the wheels and pneumatic tires of a vehicle and a central receiving and indicating unit.

Referring now to the drawings, wherein the drawings are for the purpose of illustrating the preferred embodiment of the invention only and not for purposes of limiting it. FIG. 1 illustrates a vehicle with a plurality of wheels, each having a pneumatic tire mounted thereon and a telemetry means A mounted between the wheel and the inner surface of the pneumatic tire. When one of the telemetry means senses an abnormal tire condition, it produces a radio signal indicative thereof. Mounted in a central location in the vehicle is a receiving means B for receiving the radio signals from each of the telemetry means and providing the driver with an indication of the sensed abnormal tire condition.

Figure 2:
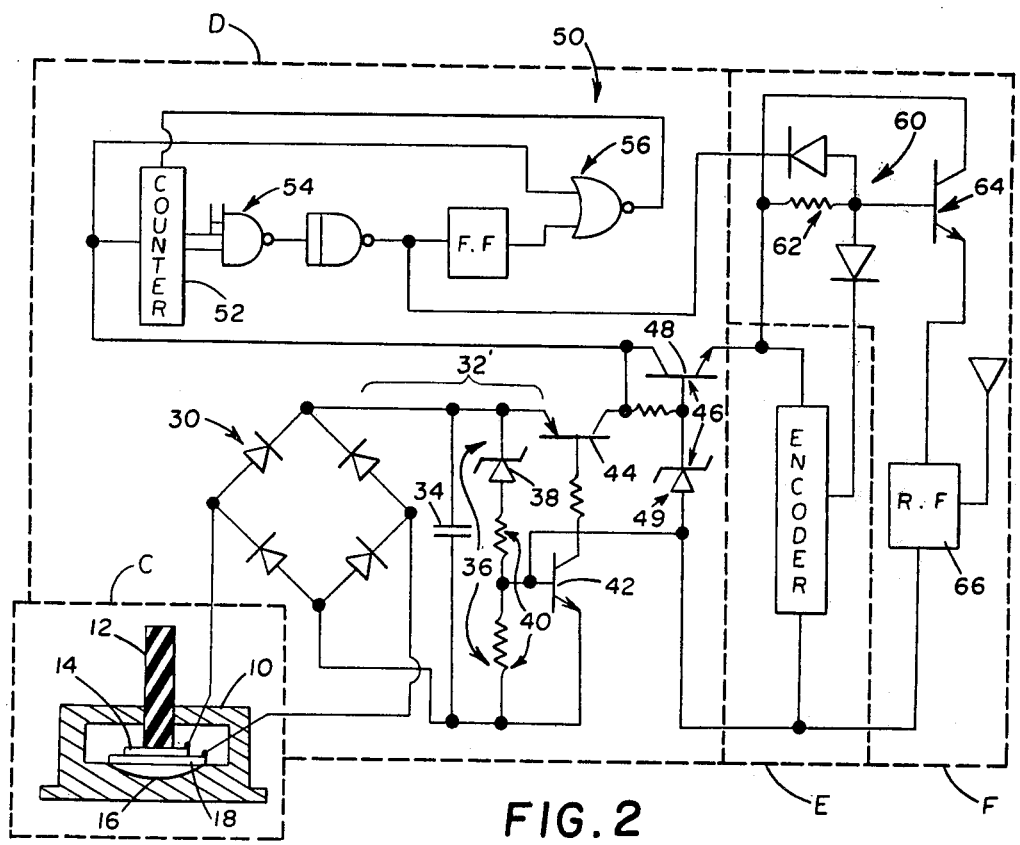
FIG. 2 illustrates an electronic circuit for the telemetry units of the abnormal tire condition sensing and indicating system of FIG. 1.
Figure 3:
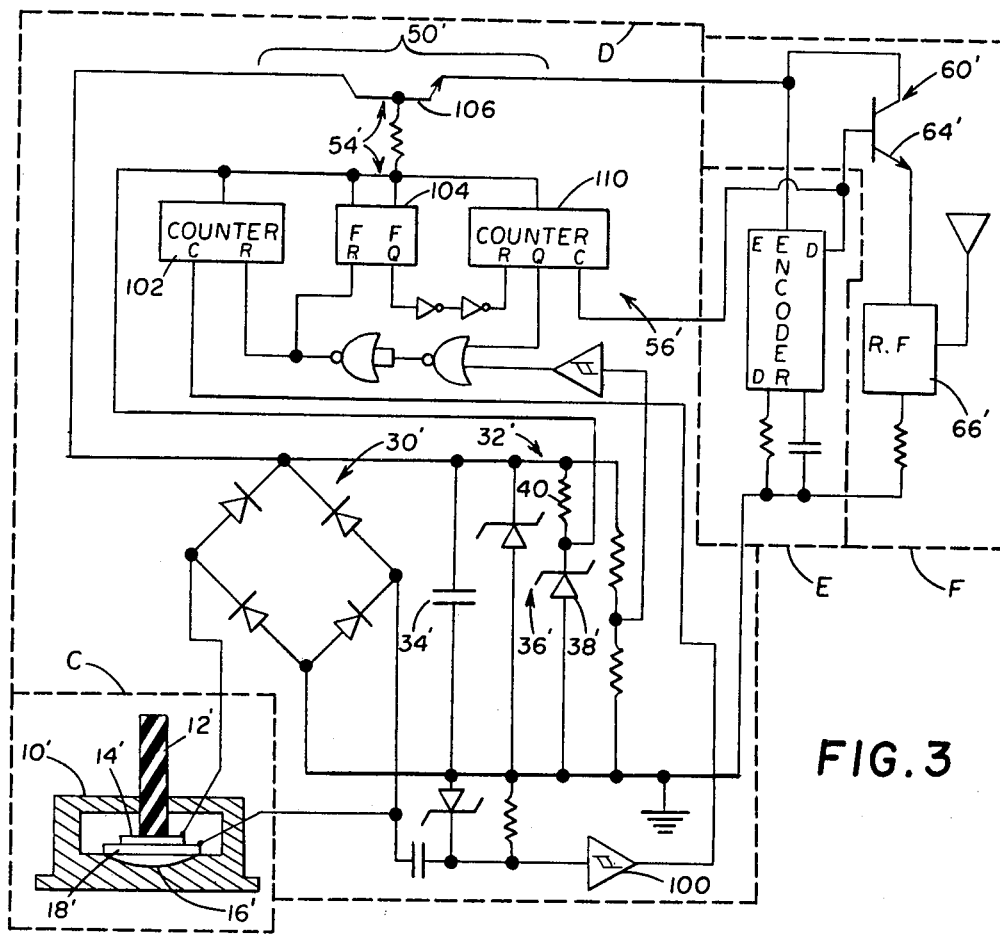
FIG. 3 is an alternate embodiment of the circuit of FIG. 2.

As illustrated in FIG. 2 or 3, each of the telemetry means includes a transducer means C for producing electrical pulses with rotation of the wheel in response to a sensed abnormal condition. An accumulator means D accumulates the pulses from the transducer means C until a predetermined level is accumulated. When the predetermined level is attained, the accumulator enables an encoder means E for producing an encoded modulating signal for a transmitting means F. Transmitter means F generates a carrier signal that is modulated by the encoded modulating signal.

Figure 4:
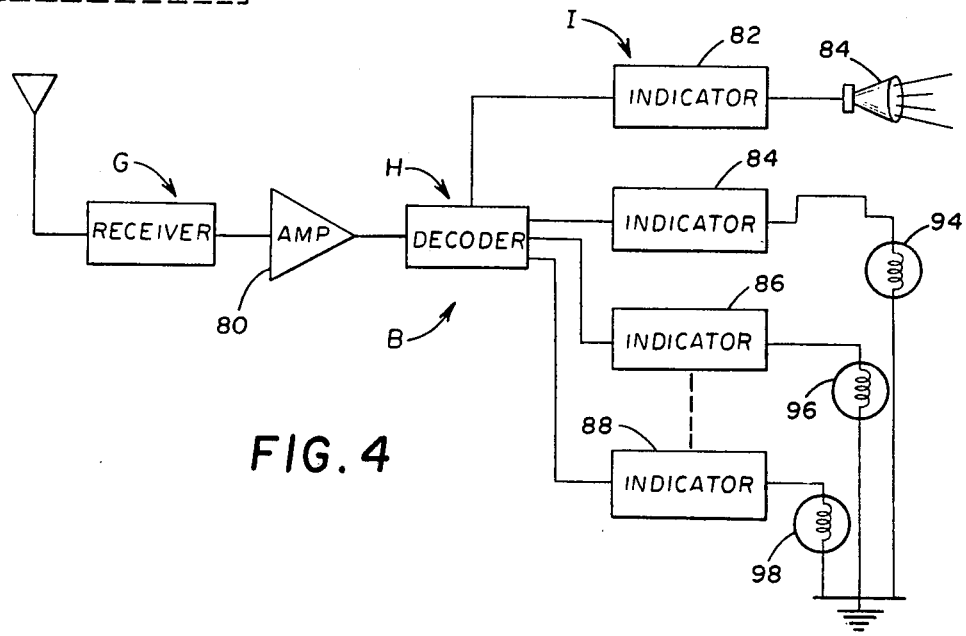
FIG. 4 illustrates an exemplary electronic circuit suitable for use in receiving and indicating unit in FIG. 1.

As illustrated in FIG. 4, receiving means B includes a radio signal receiving means G for receiving radio signals from each of telemetry means A. A decoder H determines whether the received radio signals are modulated with appropriate encoded signals. The decoder means on detecting the appropriately encoded signal actuates an indicating means I which produces an indication of the abnormal tire condition. In an alternate embodiment in which each telemetry means has a distinct code, indicator means I further indicates which telemetry means sensed the abnormal condition.

Looking now to a preferred embodiment of telemetry means A in more detail, reference is made to FIG. 2. Transducer means C includes a housing 10 which is adapted to be mounted to the wheel or the wheel rim of a vehicle. Slideably mounted in housing 10 is a mechanical member 12. Mechanical member 12 is so dimensioned that when housing 10 is mounted on the wheel rim, its outer end is adjacent the inside surface of the pneumatic tire. The mechanical member 12 is sufficiently short that when the tire is properly inflated, the inner surface of the tire does not impact the member at any point of the revolution. However, the mechanical member is sufficiently long, that when the tire is underinflated, the inner surface of the tire impacts the member as the member passes the low or road contact point of each revolution. Mechanical member 12 may be a stiff but bendable material, such as hardened rubber or plastic to inhibit breaking or permanent deformation by a badly underinflated or flat tire. The inner end of the mechanical member abuts a piezoelectric transducer 14 in the form of a wafer. When the mechanical member is impacted, it deflects the piezoelectric wafer into a small depression 16 in the housing so that impacts upon mechanical means 12 may bend the piezoelectric crystal a controlled amount. It is a property of piezoelectric crystals that compression of deflection of the crystal will cause a potential across the crystal. Electrical connections are made to one surface of the wafer 14 and a conductive substrate 18 along the opposite surface of the crystal. These connections convey the electrical impulses generated when the mechanical member 12 is impacted.

Suitable piezoelectric crystal wafers which include conductive layer 18 are sold by Vernitron under the trade name of Unimorph, by Gulton under the trade name CATT, and by Linden under the trade name of Piezo-Ceramic Disc Benders. All three of these piezoelectric elements are sold for transforming an oscillating electric potential into an acoustic, siren-like noise.

Other transducer means may also be used. For example, a battery and electric switch could be mounted in the housing for producing electrical pulses when the abnormal tire condition is sensed. Alternately, a generator powered by revolution of the wheels may replace the battery.

Other abnormal tire conditions than underinflation may be sensed. For example, overinflation may be sensed by positioning the mechanical member so as to be impacted under normal inflation but not impacted under overinflation. In such an embodiment, the logic of the circuitry is inverted to produce radio signals when the member is not impacted. As another alternative, the transducer means may sense erroneous mechanical movement of machinery parts. This may be accomplished, for example, by positioning mechanical member 12 adjacent the path of travel of a reciprocating element with such spacing that excessive travel causes the reciprocating element to impact the mechanical member 12.

The accumulator means D receives the electrical pulses from the transducer means. If the transducer means does not produce pulses of a single polarity, as is the case the piezoelectric transducers, the accumulator means may include a rectifier means 30. In the preferred embodiment, the rectifier means is a full-wave diode bridge.

The undirectional pulses from rectifier means 30 increase the stored charge in a storage means 32. The charge storage means includes a storage capacitor 34 upon which an electrical potential is stored and a threshold detector means 36 which detects whether the stored charge exceeds a predetermined level. The potential is increased with each pulse from rectifier means 30. When the stored charge reaches the predetermined threshold potential, an output signal is provided. The predetermined threshold potential is determined by the breakdown potential of a zener diode 38 and a resistive voltage divider 40. When the predetermined potential is reached, a first transistor 42 is gated to its conductive state which, in turn, gates solid state switching means or second transistor 44 to become conductive. When second transistor 44 becomes conductive, a regulator network 46 and a counter means 50 are actuated. In the regulator network, a third solid state switching means or transistor 48 becomes conductive, to supply regulated power to encoder means E and transmitting means F. The encoder means draws power until the stored potential is drained to a voltage level defined by a zener diode 49 of the regulator circuit. When the potential across zener diode 49 is equal to its breakdown voltage, transistors 42, 44 and 48 are gated off. This stops the drainage of capacitor 34 starting the next charging cycle. Thus, regulating means 46 provides encoder means E and transmitting means F with an operating potential which exceeds the minimum power required for operating these means. Counter means 50 includes a counter 52 which increases its count with each high output caused by transistor 44 becoming conductive. When counter 52 reaches a predetermined count, it enables solid state switching means 54 to produce an enable signal. The enable signal produces one of the outputs of the accumulator and actuates a reset means 56 for resetting counter 52.

With the piezoelectric transducer of the preferred embodiment, about 16 or 17 revolutions are required to charge the capacitor 34 to its predetermined potential level. The number of revolutions varies with the strength of the impact upon piezoelectric transducer 14 by mechanical member 12. Thus, after each 16 or so times that the abnormal tire condition is sensed, transistor 44 becomes conductive and increases the count on counter 52 by one. It has been found that counting about 150 occurrences of the abnormal tire condition is sufficient to differentiate between rough road conditions and an underinflated pneumatic tire. Thus, if counter 52 is set to count 9 before producing the enable signal and resetting itself, relative freedom from erroneous signals from rough roads is achieved. The time between successive enable signals will, of course, vary with the speed of the vehicle and the circumference of the pneumatic tire. For some vehicles at some speeds, 150 revolutions of the wheel will occur at shorter intervals than the FCC requirements on periodicity of radio transmissions allow. Using a counter which counts to 18 has been found sufficient for assuring that the FCC periodicity requirements between successive radio transmission cycles is met.

The encoder means E produces an encoded signal for modulating the carrier frequency of the transmitting means F. In the preferred embodiment, the encoder means provides a digitally coded signal. More specifically, the digitally coded signal is a series of square waves at regular intervals. Each square wave pulse has the same height but its duration may vary. For example, a square wave for indicating a binary one may fill ¾ of the interval between successive square waves and the square wave for indicating a binary zero may fill ¼ of the interval. A suitable encoder for producing this digitally encoded signal can be found in U.S. Pat. No. 3,906,348 issued Sept. 16, 1975, to Collin B. Willmott. Other digital codes may also be used, such as a trinary code of circuit chips produced by National Semiconductor Corporation.

The encoder means is connected by transistors 44 and 48 to the charge storage capacitor 34. Encoder means is designed to draw power from the charge storage means more rapidly than the transducer means supplies power. Thus, each time transistors 44 and 48 are rendered conductive, encoder means E discharges the stored potential to a predetermined level and allows the charging cycle to be repeated. The rate at which encoder means E and transmitter means F consume the electric potential stored on capacitor 34 determines duration of each radio broadcast. By appropriately selecting the rate at which encoder means E and radio transmitter F draw power or alternately selecting the size of capacitor 34, the duration of each radio broadcast may be selected to comply with the FCC regulations.

The transmitting means F includes a control means 60 for controlling the transmissions of encoded radio signals. Control means 60 includes an AND gate 62 and the transistor 64. One input of AND gate 62 is connected with counting means 50 to receive the enable signal therefrom. The other input of AND gate 62 is connected to the output of encoder means E. Whenever the enable signal from the counting means is high and the output from the encoding means is high, then, the output from AND gate 62 is similarly high. In this way, the AND gate passes the digitally encoded signal from encoder means E whenever counter 52 has reached the predetermined count and counting means 50 has produced an enable signal. However, until counter means 50 reaches the predetermined count, AND gate 62 blocks the output from the encoder means. The output from the AND gate controls transistor 64 rendering it conductive and nonconductive with the digitally coded signal. The output from transistor 64 controls the carrier frequency generator 66 such that a digitally modulated radio signal is produced by transmitting means F.

In the preferred embodiment, the encoded signal is a series of square waves. Each square wave has substantially the same amplitude but my have one of a plurality of widths. If the code is a binary code, the square waves will have one of two widths; a first width corresponding to a binary one and a second width corresponding to a binary zero. The number of square waves in each coded signal determines the number of bits. For example, an eight bit signal is a series of eight square waves.

The control means actuates the radio frequency generating means when it receives both the enable signal from the accumulator means and a square wave from the digital encoder means. It actuates the radio frequency generating means for short periods, each period having a duration determined by the width of the corresponding square wave pulse. Thus, an eight bit binary code is transmitted as eight spaced, short periods of the carrier frequency, each period having a duration indicative of a zero or a one.

Radio signals generated by each of the telemetry means A is received by the receiving means B. The radio signal receiving means G may, for example, be an AM superregenerative receiver. The received radio signal may be amplified by an amplifier 80 before being conveyed to a decoding means H. Decoding means H decodes the encoded modulating signal of the radio signal received by radio signal receiver G. A complimentary decoding means to the encoding means described in U.S. Pat. No. 3,906,348 is also described therein. Similarly, National Semiconductor Corporation produces complementary trinary code decoding chips for their encoding chips. When decoding means H recognizes the appropriate code, it actuates indicating means I. Indicating means I may consist of a driver circuit 82 and an audio or visual indicator. For example, an electro-acoustic transducer 84, such as one of the electric wafers described in connection with the transducer means, may be connected with the driver circuit. In this way, whenever one of the telemetry means signals an abnormal tire condition, an audio signal is produced.

If the encoding means of each telemetry means have distinct codes, then decoding means H may have a similar number of decoders. Each decoder enables one of driver circuits 84, 86 or 88. Connected with each driver is a visual indicating means such as light bulbs 94, 96 and 98. Driver circuits 84, 86 and 88 may further include hold or delay circuits so that their respective light bulb remains illuminated continuously although radio signal receiving means G only receives abnormal tire sensing conditions intermittently. Further, the indicating means may include both audio and visual indications, such as an audio signal of relatively short duration when any abnormal condition is initially sensed and visual indications which indicate both the abnormal condition and its source.

FIG. 3 illustrates an alternate embodiment of telemetry means A. In FIG. 3, corresponding parts to the embodiment of FIG. 2 are marked with like reference numerals followed by a prime, ('). The accumulating means in FIG. 3 receives pulses from the transducer means C and conveys them to a rectifier means 30' to convert the pulses to pulses of a single polarity. Single polarity pulses are conveyed to a charge storage means 32' which includes a charge storage capacitor 34' and threshold detector means 36'. With each pulse from rectifier means 30' electrical potential is accumulated. When the potential on capacitor 34' reaches the predetermined threshold level as determined by the breakdown voltage of diode 38' capacitor 34' is connected to counting means 50'. After the threshold level is reached, charge storage means 32' functions as a power supply for the counting means.

Each pulse from the transducer means is also conveyed to a Schmitt trigger 100. Whenever the transducer pulse is of sufficient amplitude, Schmitt trigger 100 produces an output pulse of fixed amplitude and duration. The output pulse from the Schmitt trigger is conveyed to a counter 102 which counts the number of pulses of the prescribed amplitude produced by the transducer means. When charge storage means 32' has reached the predetermined threshold level to supply power to counter means 50', counter 102 increases its count with each pulse from Schmitt trigger 100. When it reaches a predetermined number of counts, it triggers solid state switching means 54'. Switching means 54' comprises a flip flop 104 and a transistor 106.

When the solid state switching means is triggered, transistor 106 connects the charge storage means with encoding means E to enable it. When the transistor 106 enables encoding means E with a power supply, it starts producing the digitally coded signal. The output of encoding means E is connected to a reset means 56'. The reset means includes a counter 110 for counting the square wave pulses from digital encoding means E. When counter 110 reaches a preselected number, it resets counter 102 and flip flop 104. The predetermined number for counter 110 is determined by the number of bits in each decoded signal and the number of times each encoded signal is to be transmitted. For example, if an 8-bit signal is to be transmitted ten times, then the predetermined number is 80. Reset counter 110 in turn is reset by flip flop 104 each time counter 102 reaches its predetermined number.

Transistor 106 in addition to enabling encoder means E also enables transmitting means F. Transmitting means F includes a control means 60' which receives the enable signal from transistor 106 and the modulating signal from encoding means E. Control means 60' includes a transistor 64' which controls radio frequency generator 66' with the digitally coded signal from encoding means E to produce the digitally modulated radio signal.

When an underinflated tire condition is sensed, mechanical member 12' is impacted by the inner surface of the pneumatic tire at the low point of each wheel revolution. This in turn produces a series of output pulses from the piezoelectric crystal. These transducer pulses are received by the accumulator means and used to charge the charge storage means 32'. When the charge storage means 32' reaches the predetermined potential level, power is connected to counters 102 and 110 and flip flop 104. Additional pulses from the transducer means continue charging the charge storage means and are counted on counter 102. When the predetermined number of counts is reached, solid state switching means 54' provides an enable signal and resets counter 110. The enable signal is provided to encoder means E and transmitting means F. When enabled, encoding means E starts producing a series of digital pulses to provide the coded signal used to modulate the carrier radio frequency. The digital pulses from encoder means E are counted by reset counter 110 until it reaches its predetermined number of counts. Then, counter 102 and flip flop 104 are reset. This renders transistor 106 nonconductive stopping encoder means E and transmitting means F from functioning. Counter 102 again commences counting pulses from transistor means C and the cycle is repeated.

The invention has been described with reference to the preferred embodiment. Obviously, modifications and alterations will occur to others upon reading and understanding this specification. It is our intention to include all such modifications and alterations, in so far as they come within the scope of the appended claims or equivalence thereof, in our invention.

What is claimed is:

1. An abnormal tire condition sensing apparatus comprising:
   transducer means for detecting an abnormal tire condition and for producing electrical pulses in response to said abnormal tire condition, said transducer adapted for mounting adjacent a vehicle tire;
   p1 counter means for directly counting the number of transducer pulses, said counter means operatively connected with said transducer means, said counter means producing an enable signal upon reaching a predetermined count;
   encoder means for producing an encoded signal; and
   transmitter means for transmitting a modulated radio signal, said transmitting means operatively connected with said encoder means to receive the encoded signal for modulating a carrier frequency to produce the modulated radio signal and said encoder means and said transmitter means operatively connected with said counter means to be enabled by the enable signal whereby the enable signal enables the transmission of the modulated radio signal.

2. The sensing apparatus as set forth in claim 1 further comprising:
   receiving means for receiving said modulated radio frequency signal and producing an indicia of the abnormal tire condition.

3. The sensing apparatus as set forth in claim 2 further including:
   a vehicle having a plurality of pneumatic tires, each tire mounted on a wheel,
   said transducer means, counter means, encoder means, and transmitting means mounted on one of the plurality of wheels,
   additional transducer means, counter means, encoder means, and transmitting means mounted on others of said plurality of wheels for transmitting a modulated radio frequency signal to said receiving means in response to sensing an abnormal tire condition.

4. An abnormal tire condition sensing apparatus comprising:
   transducer means for detecting an abnormal tire condition and for producing electrical pulses in response to said abnormal tire condition, said transducer adapted for mounting adjacent a vehicle tire;
   counter means for directly counting the number of transducer pulses, said counter means operatively connected with said transducer means, said counter means producing an enable signal upon reaching a predetermined count;

encoder means for producing an encoded signal;

transmitter means for transmitting a modulated radio signal, said transmitting means operatively connected with said encoder means to receive the encoded signal for modulating a carrier frequency to produce the modulated radio signal and said encoder means and said transmitter means operatively connected with said counter means to be enabled by the enable signal whereby the enable signal enables the transmission of the modulated radio signal; and reset means for resetting said counter means, said reset means comprising a reset counter operatively connected with said encoder means for counting the number of encoded signals produced, said reset counter operatively connected with said counter means for resetting said counter means when said reset counter counts a preselected number of encoded signals, whereby the modulated radio signals are transmitted in groups, each group responsive to a predetermined number of detections of the abnormal condition.

5. The apparatus as set forth in claim 4 wherein said counter means is further operatively connected with said reset counter for resetting said reset counter when said counter means reaches said predetermined count.

6. An abnormal tire condition sensing apparatus comprising:

transducer means for detecting an abnormal tire condition and for producing electrical pulses in response to said abnormal tire condition, said transducer adapted for mounting adjacent a vehicle tire;

counter means for directly counting the number of transducer pulses, said counter means operatively connected with said transducer means, said counter means producing an enable signal upon reaching a predetermined count;

charge storage means for storing an electric potential, said charge storage means operatively connected with said transducer means for receiving the transducer pulses therefrom whereby transducer pulses increase the electric potential wherein said counter means includes solid state switching means for switching the potential from said charge storage means when said predetermined count is reached to produce said enable signal;

encoder means for producing an encoded signal; and transmitter means for transmitting a modulated radio signal, said transmitting means operatively connected with said encoder means to receive the encoded signal for modulating a carrier frequency to produce the modulated radio signal and said encoder means and said transmitter means operatively connected with said counter means to be enabled by the enable signal whereby the enable signal enables the transmission of the modulated radio signal.

7. The sensing apparatus as set forth in claim 6 wherein said encoder means is operatively connected with said switching means whereby the stored charge is the power supply for the encoder means.

8. The sensing apparatus as set forth in claim 7 wherein said transmitting means includes carrier frequency generating means for generating a carrier frequency and control means for controlling said carrier frequency generating means, said control means operatively connected to said encoder means for receiving said encoded signal for modulating the carrier frequency and operatively connected to said first switching means for receiving said enable signal, said control means enabled by said enable signal.

9. The sensing apparatus as set forth in claim 8 wherein said encoder means is a digital encoder means whereby said encoded signal is a digitally coded signal.

10. The sensing apparatus as set forth in claim 6 wherein said charge storage means includes a threshold detector means for connecting the stored potential to said counter means to provide power supply when said stored potential reaches a predetermined threshold level whereby said counter means is quiescent until said charge storage means stores the predetermined potential.

* * * * *

UNITED STATES PATENT AND TRADEMARK OFFICE
CERTIFICATE OF CORRECTION

PATENT NO. : 4,237,728

DATED : December 9, 1980

INVENTOR(S) : David A. Betts; Gregory W. Ledenbach

It is certified that error appears in the above-identified patent and that said Letters Patent are hereby corrected as shown below:

Column 8, line 26, delete "p1".

Signed and Sealed this

Twenty-fourth Day of February 1981

[SEAL]

Attest:

Attesting Officer

RENE D. TEGTMEYER

Acting Commissioner of Patents and Trademarks